(12) United States Patent
Winter et al.

(10) Patent No.: US 7,731,879 B2
(45) Date of Patent: Jun. 8, 2010

(54) EXTRUSION OF PEROXIDE CROSSLINKABLE POLYMER PARTS

(75) Inventors: Karlheinz Winter, Rehau (DE); Gerhard Dunkel, Rehau (DE); Günther Seewald, Döhlau (DE); Hermann Zwilling, Rehau (DE)

(73) Assignee: Rehau AG & Co., Rehau (DE)

( * ) Notice: Subject to any disclaimer, the term of this patent is extended or adjusted under 35 U.S.C. 154(b) by 312 days.

(21) Appl. No.: 10/690,498

(22) Filed: Oct. 23, 2003

(65) Prior Publication Data

US 2004/0086592 A1 May 6, 2004

(30) Foreign Application Priority Data

Oct. 31, 2002 (DE) ................ 102 51 152

(51) Int. Cl.
*D01D 5/24* (2006.01)
*B29C 47/78* (2006.01)
(52) U.S. Cl. .......... 264/209.6; 264/40.6; 264/171.26; 264/209.1; 264/209.7; 264/211; 264/211.21; 264/211.23; 264/211.24; 264/236; 425/204; 425/378.1
(58) Field of Classification Search ........... None
See application file for complete search history.

(56) References Cited

U.S. PATENT DOCUMENTS

| 2,528,523 | A | * | 11/1950 | Kent | 428/379 |
|---|---|---|---|---|---|
| 2,547,000 | A | * | 4/1951 | Gray | 366/87 |
| 2,547,151 | A | * | 4/1951 | Braeseke | 425/204 |
| 2,628,214 | A | * | 2/1953 | Pinkney et al. | 525/387 |
| 2,968,836 | A | * | 1/1961 | Colombo | 366/75 |
| 2,972,780 | A | * | 2/1961 | Boonstra | 264/475 |
| 3,095,608 | A | * | 7/1963 | Munsell | 264/169 |
| 3,331,100 | A | * | 7/1967 | Gould | 425/379.1 |
| 3,868,436 | A | * | 2/1975 | Ootsuji et al. | 264/40.6 |
| 3,896,198 | A | * | 7/1975 | Utumi et al. | 264/45.9 |
| 3,928,525 | A | * | 12/1975 | Fuwa et al. | 264/171.17 |
| 3,979,488 | A | * | 9/1976 | Greenhalgh et al. | 264/40.7 |
| 4,126,661 | A | * | 11/1978 | Fulconis et al. | 264/209.6 |

(Continued)

FOREIGN PATENT DOCUMENTS

DE 21 46 024 A 3/1973

(Continued)

OTHER PUBLICATIONS

Rosato, Extruding Plastics—A Practical Processing Handbook, Springer-Verlag, 1998, pp. 22-24, 76-81, and 213.*

(Continued)

*Primary Examiner*—Jeffrey Wollschlager
(74) *Attorney, Agent, or Firm*—Venable LLP; Robert Kinberg; Ryan M. Flandro

(57) ABSTRACT

A process for the extrusion of peroxide crosslinked polymer parts, mainly tubes, in which the crosslinkable polymer is heated in an extruder in a controlled manner to a value above the crystallite melting point of the polymer, but below the crosslinking temperature, and fed continuously to an extrusion die to create the part and in which at least a partial crosslinking of the polymer is achieved in the extrusion die by heating of the polymer above a crosslinking temperature provision.

13 Claims, 1 Drawing Sheet

U.S. PATENT DOCUMENTS

| | | | | |
|---|---|---|---|---|
| 4,183,448 A | * | 1/1980 | Nash | 222/63 |
| 4,243,773 A | | 1/1981 | Arnaud et al. | |
| 4,454,092 A | * | 6/1984 | Shimizu et al. | 264/349 |
| 4,797,242 A | * | 1/1989 | Fukuda et al. | 264/108 |
| 5,204,039 A | * | 4/1993 | Miyasaka et al. | 264/209.2 |
| 5,804,116 A | * | 9/1998 | Schmid et al. | 264/104 |

FOREIGN PATENT DOCUMENTS

| | | | |
|---|---|---|---|
| DE | 2303830 | * | 10/1973 |
| DE | 2 220 147 A | | 11/1973 |
| DE | 2 234 386 A | | 1/1974 |
| DE | 24 42 230 A1 | | 3/1976 |
| DE | 27 54 877 B1 | | 2/1979 |
| DE | 35 40 024 A1 | | 5/1986 |
| DE | 0 999 030 A2 | | 5/2000 |
| WO | WO 94/21441 | | 9/1994 |

OTHER PUBLICATIONS

M. Jaecker, "Das Konische Konzept Der Zukunft Vorteile Der Negativ-Konischen Gangtiefe Bei Doppelschneckenextrudern," Kunststoffe, Carl Hanser Verlag, Bd. 90, Nr. 12, Dec. 2000, Seite 64 and 66.

* cited by examiner

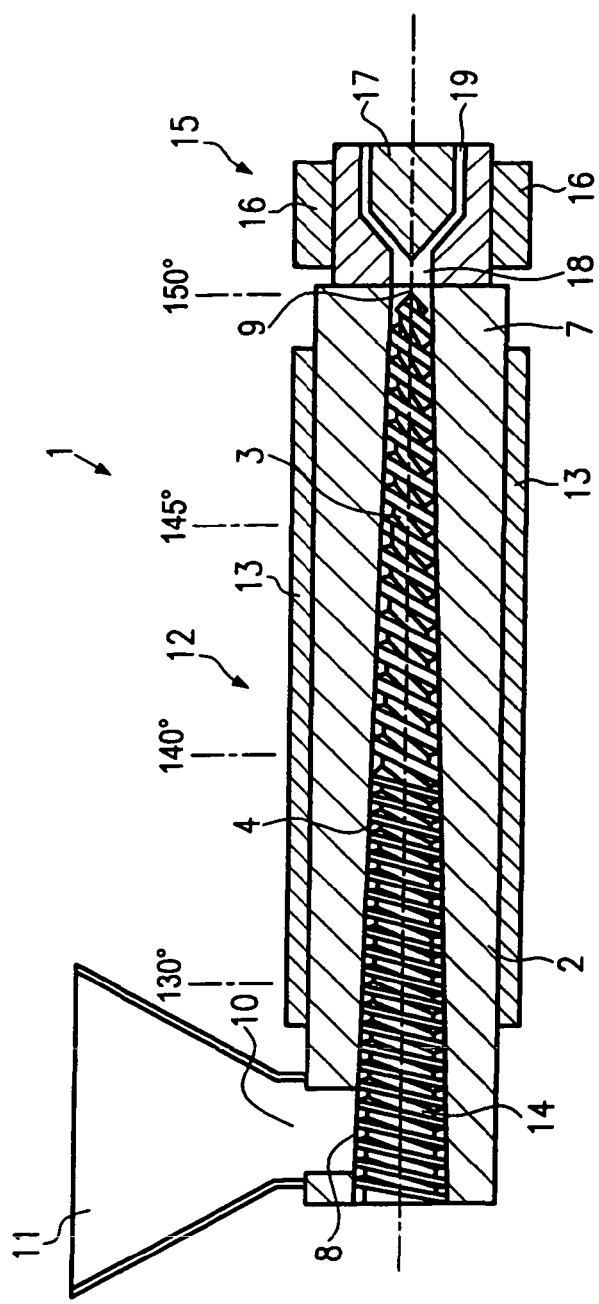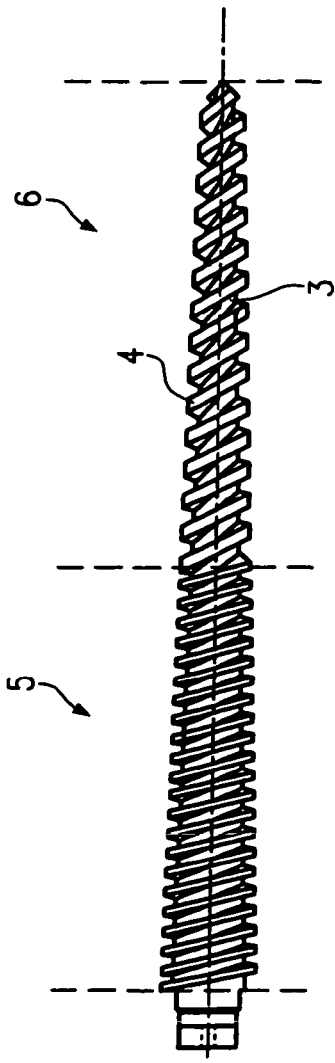
FIG. 1
FIG. 2

EXTRUSION OF PEROXIDE CROSSLINKABLE POLYMER PARTS

CROSS-REFERENCE TO RELATED APPLICATION

This application claims the benefit of German Application No. 102 51 152.7, filed Oct. 31, 2002, which is relied upon and is expressly incorporated by reference herein.

BACKGROUND OF THE INVENTION

This invention relates to a process for the extruding peroxide crosslinkable polymer parts, mainly tubes, in which the crosslinkable polymer is heated in an extruder and is fed continuously to an extrusion die to create the part and in which at least a partial crosslinking of the polymer occurs in the extrusion die by the heating of the polymer above a crosslinking temperature.

EP 0 999 030A1. describes a process, in which tubes are made of a peroxide crosslinkable polymer. These tubes consist of a polyethylene to which an organic peroxide is added as the crosslinking agent as well as an antioxidant. Other polyolefins, such as polypropylene and copolymers of ethylene and propylene with monounsaturated or poly unsaturated polymerizable monomers can also be used in place of polyethylene. In the process described in EP 0 999 030, the unmolten mixture of the polymer and the peroxide is fed to the extruder through a known feed hopper. The extruder conveys the polymer to the extrusion die, in which the tube is then created and the crosslinking of the polymer is achieved. For this purpose, heat is induced in the vicinity of the extrusion die, which initiates the crosslinking of the polymer. Firstly, the polymer is melted with the crosslinking agent in the extrusion die, and then heated above the crosslinking temperature. The material crosslinked in the extrusion die then discharges from the extrusion die as an extruded tube. To prevent premature melting and crosslinking of the polymer, the extruder is particularly short, in length, and is also equipped with a cooling unit at its exterior.

The finished tubes are particularly suitable as water pipes. Compliance with the process parameters poses a problem in the manufacture of this type of tubes. Failure to address these problems can lead to heavy fluctuations in the quality during the manufacture of the tubes or parts.

Unintended crosslinking can also lead to undesired stresses and loads in the extruder or the extrusion die. Apart from inadequate properties of the finished tube, this can also cause damage to the extrusion die or the extruder.

SUMMARY OF THE INVENTION

In accordance with the invention, an improved process for the extrusion and crosslinking of hollow objects, such as pipes and conduits, is described. The process of the invention provides control of the cross-linking to produce the most constant and high quality of the finished parts.

The improvements of the invention are fulfilled by a process of the type described above, in which a heating/cooling unit controls the temperature of the unmolten polymer in the extruder to a value above the crystallite melting point of the polymer, but below the crosslinking temperature, and in which the temperature is only raised above the crosslinking temperature after entry into the extrusion die.

DESCRIPTION OF THE DRAWINGS

FIG. 1 is a cross-sectional view of an assembly 1 in which an extruder 2 is equipped with a screw 3, on which a spiral 4 is installed.

FIG. 2 shows a cross-sectional view of a screw of an extruder of an assembly used in accordance with the invention.

DETAILED DESCRIPTION OF THE INVENTION

In accordance with this invention, the process for the manufacture of parts made of crosslinked polymers can be controlled more easily. By the controlled heating of the polymer to a value above the crystallite melting point in the extruder, the polymer can be homogenized before it reaches the actual extrusion die, by which an improved quality of the finished part can be achieved. The quality of the finished part can also be improved by controlling the increase in the temperature of the polymer. Crosslinking occurs at a temperature higher than the polymer melting point only in a controlled manner in the extrusion die. However, because the temperature difference between the melting point and the crosslinking temperature is relatively small, the crosslinking can be controlled better here and the degree of crosslinking can be increased.

The process involves a two stage temperature extrusion and cross linking operation of a crosslinkable polymer composition containing a crosslinking agent. To achieve the best possible homogenization of the polymer during melting, it can also be of advantage if the temperature of the unmolten polymer in the extruder, controlled from approximately 120° to 140° C., preferably 130° C., is raised above the melting point. For example, the polymer may be preheated before it is fed to the extruder. It can be of advantage if the melting point of the polymer is approximately 125 to 140° C., preferably approximately 135° C. It can also be of advantage if the temperature of the polymer before it enters the extrusion die is not more than 30% above the crystallite melting point of the polymer. This allows the premature crosslinking of the polymer to be effectively prevented. The temperature of the extruder and its polymer contents may be controlled externally by a heating/cooling unit. It has been found that the temperature gradient in the extruder can be more easily controlled and monitored by this arrangement.

It can also be of advantage to exchange heat from the extruder from the interior by the heating/cooling unit. This can be achieved, e.g. by a coolant in a hollow drilled screw of the extruder. The temperature of the polymer in the extruder can be precisely determined and controlled by the induction of heat from the exterior or the extraction of heat from the interior. The quality of the finished parts can also be improved in this manner. For the execution of the process, it can be of advantage if the temperature of the polymer in the extrusion die is at least 15% above the crosslinking temperature.

It can also be of advantage if the melting pressure before entry to the extrusion die does not exceed approximately 700 to 1500 bar, preferably 1200 bar. The load on the equipment used to execute the process can also be reduced in comparison with other processes by this means.

The crosslinking temperature designates the temperature at which radicals are produced by the breakdown of the peroxides, causing the crosslinking of the polymer. The time and speed of this breakdown is defined by the half life of the peroxide, which is approximately 3 minutes in the process of the invention. In this manner, a particularly high degree of crosslinking can be achieved during the continuously running process.

It can also be of advantage in the execution of the process if the crosslinking temperature of the polymer is different from the polymer melting point (crystallite melting point) and is approximately 30% above the crystallite melting point. The polymer containing composition must be adjusted accordingly by the addition of the crosslinking agent and possibly other additives. In particular embodiments, the crosslinking temperature of the polymer is approximately 165° to 185° C., preferably 175° C.

It can also be of advantage to employ a twin screw extruder. The output of finished parts can be increased with such a twin screw extruder. Moreover, it has been found that the thermal behavior of the polymer can be more precisely controlled in a twin screw extruder.

In an improved development of the invention, the temperature of the polymer in the extrusion die can be achieved by the induction of heat from the exterior in the extrusion die. The temperature can be more easily monitored by the induction of heat from the exterior. The construction of the machine is also simplified.

In an alternate embodiment to achieve a more rapid increase in the temperature, the temperature of the polymer in the extrusion die can also be controlled by the induction of heat from the interior.

It can also be of advantage to the finished part and its quality if the degree of crosslinking of the polymer when it discharges from the extrusion die is over 60%, preferably over 70%.

To improve the quality of the finished part, it can also be of advantage if the temperature of the part is maintained at a temperature above the crosslinking temperature after the part has discharged from the extrusion die. This allows the crosslinking to proceed and complete crosslinking can be achieved.

The part can be cooled after the crosslinking is complete. The time until the further processing of the part can be reduced by cooling.

The invention also comprises an assembly (an apparatus) for the execution of the process of the invention with an extruder equipped with an inlet and an outlet and with a feeding device to feed a polymer to the extruder at the inlet of the extruder and with an extrusion die at the outlet of the extruder, in which a heating/cooling unit is employed with which the temperature of the unmolten polymer in the extruder is controlled to a temperature above the crystallite melting point of the polymer and the heating/cooling unit is equipped with at least a heating device outside the extruder.

The process of the invention can be executed and the advantages of the invention achieved with the apparatus.

It can also be of advantage if a cooling unit is installed in the interior of the extruder. Such a cooling unit allows a combination of heating at the exterior of the extruder and cooling at the interior of the extruder and thereby offers a controlled thermal behavior of the polymer.

It can also be of advantage if the extrusion die can be heated. This allows the crosslinking in the extrusion die to be accelerated.

In this, it can be of advantage if the extrusion die can be heated both from the interior and the exterior. The crosslinking process can then be accelerated.

With reference to FIG. 1, it can also be of advantage if the length of one screw (3) of the extruder (2) between the inlet and the outlet is greater than the length of the inlet. This can lead to a particularly gentle (or controlled) processing of the polymer.

In one embodiment of the invention, the extruder has two screws and is constructed as a twin screw extruder. This increases the throughput and achieves a particularly gentle (or controlled) processing of the polymer material.

In another embodiment of the invention, the screw of the extruder can have at least two sections of differing pitch. This also allows control of the temperature of the polymer when it is conveyed through the extruder.

In an additional design embodiment of the invention, the screw of the extruder can be equipped with mixing elements in at least one section, by which a better mixing and homogenization of the molten polymer can be achieved. It can be of advantage if the pitch of the section closer to the outlet in the conveying direction is greater than that in the section closer to the inlet. A positive influence on the thermal behavior can be made in this manner.

It can also be of advantage if the width of the lands of a section of the screw increases in the conveying direction. This can have a positive effect on the behavior of the polymer when it is conveyed. It can also be of advantage if the diameter of the screw of the extruder decreases in the conveying direction. To simplify the cooling of the screw of the extruder, the screw can be hollow.

The invention apparatus and method are explained in more detail below with reference to FIGS. 1 and 2. FIG. 1 shows a schematic diagram of a facility according to the invention to execute the process of the invention. FIG. 2 shows a screw of an extruder of the facility of the invention.

The screw 3 of the extruder 2 is shown magnified in FIG. 2. The screw 3 is tapered conically in the conveying direction and is equipped with a first section 5 and a second section 6, in which the pitch of the spiral 4 in sections 5 and 6 differs. In the first section 5, the pitch of the spiral is smaller than in the second section 6. The width of the lands is also smaller in the conveying direction in the first section 5 than in the second section 6.

The screw 3 is retained in a cylinder 7 of the extruder 2 and the cylinder 7 is equipped with an inlet 8 and an outlet 9. At the inlet 8, a feeding device in the form of a hopper 11 is located above an opening 10 in the cylinder 7. The facility is also equipped with a heating/cooling unit 12 with a heating device 13 at the exterior of the cylinder 7. The heating device 13 may be equipped with several heating elements, so-called heating bands. The screw 3 is also hollow and allows the cooling medium of a cooling unit 14 to flow through. An extrusion die 15 is located at the outlet 9 of the extruder 2 and is equipped with heating units 16 and 17 at both the inside and the outside. The inlet 18 of the extrusion die 15 is connected to the outlet 9 of the extruder 2. A finished part can discharge through the outlet 19 of the extrusion die.

To execute the process, a mixture of a polyolefin, e.g. polyethylene HDPE/UHMPE or another crosslinkable polymer is mixed with a crosslinking agent, e.g. organic peroxide with a crosslinking temperature of 180° to 210° C. and a half life of 1 min and a stabilizer or other components and fed to the hopper 11; (the polyolefin can be polyethylene, polypropylene or copolymer of either). The polyethylene can be added as coarse powder or pellets, the stabilizer as powder or pellets and the peroxide as a liquid, pellets or powder. The finished tubes are so-called PE-Xa tubes, in which PE-Xa indicates a crosslinked polymer. The mixture passes through the opening 10 and the inlet 8 into the extruder 2. The screw 3 of the extruder 2 is driven continuously by a drive which is not depicted, resulting in a conveying motion of the polymer from the inlet 8 to the outlet 9. Due to the design of the screw 3, the polymer is mixed and heated on the way from the inlet 8 to the outlet 9, in which the design of the screw 3 promotes heating. The heating process is also controlled by the heating unit 13 and the cooling unit 14, during which the heating unit 13 or the cooling unit 14 can induce or extract heat into or from the polymer in a controlled manner. In this manner, a particularly even heating and homogenization of the polymer, the stabilizers and the crosslinking agent can be achieved. The polymer is heated above its melting point but below the crosslinking temperature as far as the outlet 9. In this example, the melting point is approximately 160° C. This value may differ according to the properties of the polymer. The crosslinking temperature in this example is 175° C. The now molten but not yet crosslinked polymer then passes through the inlet 18 into the extrusion die 15, where it receives its final shape. The polymer is further heated by heating units from approximately 160° C. to a value above the crosslinking temperature, by which the temperature of the polymer in the preferred example is increased to 230° C. This causes a strong crosslinking of the polymer in the extrusion die. The degree of crosslinking as a measure of the crosslinking is over 70% to DIN 16892.

Because only little further heating of the already molten polymer occurs in the extrusion die, this has a positive effect on the dimensional precision of the finished parts discharged from the outlet 19 of the extrusion die 15. It is thereby possible to manufacture parts with high dimensional precision and a high degree of crosslinking. Apart from polyethylene and polyolefin's, other crosslinkable polymers are also conceivable.

In the succeeding process steps, the part discharging from the outlet 19 of the extrusion die 15 can be further heated above the crosslinking temperature to achieve complete crosslinking. A cooling device can also be provided by which the part can be cooled after complete crosslinking to allow it to be fed as quickly as possible to further process steps.

Due to the controlled, gentle heating of the polymer in the extruder, a good degree of homogenization of the polymer can be achieved. The loads in the extruder can also be reduced because unintended crosslinking can be avoided. Various points with the associated temperatures are indicated in FIG. 1. It can be seen from this how continuously a polymer is heated during conveying. The temperature increases from approximately 130° to 140°, 145° and finally to 150° C. and slightly above. The design of the screw 3 has also proved to be particularly advantageous for the execution of the process. The specific pitch and the design of the screw promotes the even mixing and heating of the polymer.

Tubes made by the process of the invention are suitable for sanitary cold and hot water piping, underfloor and wall heating, radiator connections, remote heating pipes, underground gas, water and sewage pipes, compressed air pipes, industrial piping networks for liquid and gaseous media, earth collectors and special piping applications.

From a consideration of the above specification, it will be appreciated that many improvements and modifications in the details may be made without departing from the scope and spirit of the invention. It is to be understood therefor that the invention is in no way limited, except as defined by the appended claims.

What is claimed is:

1. A method for extruding a peroxide crosslinked polymer tube, comprising:
   supplying a mixture to a screw extruder, the mixture comprising: a crosslinkable polymer, a crosslinking agent, and a stabilizing agent, wherein the polymer has a crystallite melting point and a crosslinking temperature, and wherein the screw extruder is a conically tapered screw extruder having at least two sections of differing spiral pitch;
   heating the mixture in the screw extruder with an external heating unit to a temperature above the crystallite melting point but below the crosslinking temperature;
   controlling the temperature of the mixture in the screw extruder with the external heating unit and an internal cooling unit;
   continuously feeding the mixture from the screw extruder to an extrusion die, wherein a melting pressure before entry to the extrusion die is approximately 700-1500 bar;
   heating the mixture in the extrusion die above the crosslinking temperature to effect at least a partial crosslinking of the polymer in the extrusion die, wherein the temperature (° C.) of the mixture in the extrusion die is at least 15% above the crosslinking temperature (° C.); and
   discharging the mixture from the extrusion die, wherein the degree of crosslinking of the polymer on discharge from the extrusion die is above 60%.

2. The method of claim 1, wherein the crosslinking agent comprises organic peroxide.

3. The method of claim 1, wherein the melting pressure before entry to the extrusion die is approximately 1200 bar.

4. The method of claim 1, wherein said extruder is a twin screw extruder.

5. The method of claim 1, wherein the temperature of the polymer in the extrusion die is achieved by heating the extrusion die externally.

6. The method of claim 1, wherein the temperature of the polymer in the extrusion die is achieved by the induction of heat from the interior of the extrusion die.

7. The method of claim 1, wherein the temperature (° C.) of the polymer in the extrusion die is not higher than 60% above the crosslinking temperature (° C.) of the polymer.

8. The method of claim 1, wherein the temperature (° C.) of the polymer before entering the extrusion die is not higher than 30% above the crystallite melting point (° C.) of the polymer.

9. The method of claim 1, wherein the crosslinking temperature (° C.) of the polymer is approximately 30% above the crystallite melting point (° C.) of the polymer.

10. The method of claim 1, wherein the crystallite melting point of the polymer is approximately 125-140° C.

11. The method of claim 1, wherein the crosslinking temperature of the polymer is approximately 165-185° C.

12. The method of claim 1, wherein the tube is maintained at a temperature above the crosslinking temperature after discharge from the extrusion die.

13. The method of claim 1, wherein the tube is cooled after crosslinking.

\* \* \* \* \*